(12) United States Patent
Moore

(10) Patent No.: US 12,212,677 B2
(45) Date of Patent: Jan. 28, 2025

(54) SYSTEMS AND METHODS FOR DECENTRALIZED SYNCHRONIZATION AND BRAIDED CONFLICT RESOLUTION

(71) Applicant: SPIDEROAK, INC., Lenexa, KS (US)

(72) Inventor: Jonathan Andrew Crockett Moore, Portland, OR (US)

(73) Assignee: SpiderOak, Inc., Lenexa, KS (US)

( * ) Notice: Subject to any disclaimer, the term of this patent is extended or adjusted under 35 U.S.C. 154(b) by 0 days.

(21) Appl. No.: 18/231,077

(22) Filed: Aug. 7, 2023

(65) Prior Publication Data

US 2024/0022411 A1 Jan. 18, 2024

Related U.S. Application Data

(63) Continuation of application No. 17/867,061, filed on Jul. 18, 2022, now Pat. No. 11,757,642.

(51) Int. Cl.
| | | |
|---|---|---|
| *H04L 9/32* | (2006.01) | |
| *G06F 21/62* | (2013.01) | |
| *H04L 9/00* | (2022.01) | |
| *H04L 9/40* | (2022.01) | |

(52) U.S. Cl.
CPC ............ *H04L 9/3213* (2013.01); *G06F 21/62* (2013.01); *H04L 9/50* (2022.05); *H04L 63/101* (2013.01); *H04L 63/102* (2013.01)

(58) Field of Classification Search
CPC ....... H04L 9/3213; H04L 9/50; H04L 63/101; H04L 63/102; G06F 21/62
See application file for complete search history.

(56) References Cited

U.S. PATENT DOCUMENTS

| | | | | |
|---|---|---|---|---|
| 7,694,166 B1* | 4/2010 | Suggs | ................ | G06F 11/2025 |
| | | | | 714/4.11 |
| 8,453,203 B2* | 5/2013 | Lerner | .................... | H04L 63/20 |
| | | | | 709/240 |
| 9,313,230 B1* | 4/2016 | Kruse | ................... | G06F 11/004 |
| 9,531,719 B1* | 12/2016 | Sutton | .................. | H04L 63/083 |
| 10,740,287 B2* | 8/2020 | Haviv | .................. | G06F 3/0685 |
| 11,108,826 B2 | 8/2021 | Curtis et al. | | |

(Continued)

FOREIGN PATENT DOCUMENTS

JP 4164614 B2 10/2008

OTHER PUBLICATIONS

International Search Report and the Written Opinion of the International Searching Authority dated Nov. 22, 2023 for International Application No. PCT/US2023/027984, 24 pages.

*Primary Examiner* — Jason Chiang
(74) *Attorney, Agent, or Firm* — Perkins Coie LLP

(57) ABSTRACT

A conflict-free method of independently governing user authority across one or more devices includes managing user and device authority without the use of a centralized server. The conflict-free method utilizes a conflict-free replicated data type (CRDT) which resolves potential conflicts between merging linear sequences. A first linear sequence at a first electronic device merges with a second linear sequence at a second electronic device. The first linear sequence and the second linear sequence are different due to independent processes performed on devices that are not connected via a network at some point in time. Potential conflicts between the first linear sequence and the second linear sequence are resolved in accordance with CRDTs.

15 Claims, 15 Drawing Sheets

(56) References Cited

U.S. PATENT DOCUMENTS

| | | | |
|---|---|---|---|
| 11,108,828 B1* | 8/2021 | Curtis | H04L 63/20 |
| 11,483,353 B1* | 10/2022 | Shen | H04L 63/20 |
| 2005/0008163 A1* | 1/2005 | Leser | H04L 9/08 |
| | | | 380/281 |
| 2007/0124482 A1* | 5/2007 | Lee | H04L 63/168 |
| | | | 709/228 |
| 2008/0195759 A1* | 8/2008 | Novik | H04L 9/40 |
| | | | 709/248 |
| 2012/0290576 A1* | 11/2012 | Amorim | G06F 16/258 |
| | | | 707/E17.046 |
| 2014/0172808 A1* | 6/2014 | Burge | G06F 21/604 |
| | | | 707/694 |
| 2014/0282818 A1* | 9/2014 | Singer | H04L 63/0263 |
| | | | 726/1 |
| 2014/0359695 A1* | 12/2014 | Chari | G06F 21/604 |
| | | | 726/1 |
| 2015/0186668 A1* | 7/2015 | Whaley | G06F 16/2379 |
| | | | 713/176 |
| 2017/0031676 A1* | 2/2017 | Cecchetti | G06F 8/65 |
| 2020/0050613 A1* | 2/2020 | Gauvreau, Jr. | G06F 16/28 |
| 2020/0106605 A1* | 4/2020 | Mord | H04L 9/0825 |
| 2020/0128047 A1* | 4/2020 | Biswas | H04L 63/1425 |
| 2020/0186355 A1* | 6/2020 | Davies | H04L 63/123 |
| 2020/0193047 A1* | 6/2020 | Moore | H04L 9/0643 |
| 2020/0257778 A1* | 8/2020 | Pham | G06F 21/45 |
| 2020/0320211 A1* | 10/2020 | Moore | H04L 9/0894 |
| 2020/0409683 A1* | 12/2020 | Fu | G06F 21/62 |
| 2021/0056544 A1* | 2/2021 | Mitra | G06Q 20/308 |
| 2021/0109902 A1* | 4/2021 | Glasser | H04L 9/3239 |
| 2021/0263910 A1* | 8/2021 | Xiao | G06F 16/27 |
| 2021/0320974 A1* | 10/2021 | Bi | H04L 67/06 |
| 2021/0365436 A1* | 11/2021 | Farber | G06F 16/214 |
| 2021/0392142 A1* | 12/2021 | Stephens | H04L 63/104 |
| 2022/0237565 A1* | 7/2022 | Dzierzanowski | G06Q 10/103 |
| 2022/0263656 A1* | 8/2022 | Moore | H04L 9/0833 |
| 2022/0327239 A1* | 10/2022 | Macallum | G06F 21/6209 |
| 2022/0374733 A1* | 11/2022 | Xie | G06N 5/04 |
| 2022/0382713 A1* | 12/2022 | Sadiq | G06F 16/27 |
| 2022/0385671 A1* | 12/2022 | Silverstein | H04L 63/1408 |
| 2022/0391359 A1* | 12/2022 | Dronamraju | G06F 11/2094 |
| 2023/0006825 A1 | 1/2023 | Moore | |
| 2023/0134651 A1* | 5/2023 | Agbamu | G06V 40/172 |
| | | | 705/325 |
| 2023/0195750 A1* | 6/2023 | Abraham | G06F 11/1451 |
| | | | 707/613 |
| 2023/0401526 A1* | 12/2023 | Hu | G06Q 10/0835 |

* cited by examiner

SYSTEMS AND METHODS FOR DECENTRALIZED SYNCHRONIZATION AND BRAIDED CONFLICT RESOLUTION

CROSS-REFERENCE TO RELATED APPLICATION(S)

The present application is a continuation of U.S. patent application Ser. No. 17/867,061 filed Jul. 18, 2022, entitled "SYSTEMS AND METHODS FOR DECENTRALIZED SYNCHRONIZATION AND BRAIDED CONFLICT RESOLUTION," the contents of which are hereby incorporated by reference in its entirety.

TECHNICAL FIELD

The present disclosure relates to systems and methods for managing access for secured systems and, more particularly, to systems and methods for resolving and/or preventing conflicts when managing access for secured systems.

BACKGROUND

Computing systems, as they become more integrated with daily life, typically store or control highly sensitive information, such as source code, legal documents, company information, trade secrets, and so on. This highly sensitive information is often valuable and computing systems storing this information are targeted by bad actors seeking unauthorized access. While some of these bad actors are external, computing systems also face many internal threats, such as an employee leaking or otherwise improperly accessing information. For example, global administrators may be able to give themselves access to a site or file due to their administration privileges, even though the owner of the site or file may not want global administrators to have access to potentially sensitive information on the site or file. Internal threats may also be inadvertent, such as when an employee unintentionally shares highly sensitive information or falls victim to a social engineering scheme.

One approach to infrastructure centralizes the management and provision of security and access control with administrators, thereby allowing people access to information without a need to know that information. As a result, administrators who do not have the authority to read data stored on the server that they are administering can still gain access and read the data by granting themselves the necessary permissions. However, centralization may result in situations where a device is not allowed access to protected information because it is not connected to a central server. This arrangement may not be suitable for devices that typically move outside of network range and access to secured information.

SUMMARY

This summary is provided to introduce a selection of concepts in a simplified form, as further described below in the Detailed Description section. This summary is not intended to identify key or essential features of the claimed subject matter, nor is it intended to be used as an aid in determining the scope of the claimed subject matter.

Disclosed herein are devices, systems, and methods for independently governing user authority across one or more devices.

Embodiments described herein generally relate to a conflict-free method of independently governing user authority across one or more devices. The conflict-free method may comprise receiving, at a first electronic device of a set of electronic devices, a first linear sequence defining a set of blocks. The set of blocks may comprise a first block defining a policy specifying a role and an authority associated with the role, where the role is associated with at least one operation. The set of blocks may also comprise a second block comprising a unique user ID identifying a user and associating the unique user ID with the role and the authority associated with the role as specified in the policy. After receiving the first linear sequence, the conflict-free method may further comprise performing, using the first electronic device, the at least one operation in accordance with the role, the authority associated with the role, and the associated unique user ID. The at least one operation may be performed when the first electronic device is not in communication with other electronic devices of the set of electronic devices. The conflict-free method may then comprise creating, at the first electronic device, a second linear sequence by appending a third block corresponding to performance of the at least one operation to the first linear sequence. After creating the second linear sequence and using the first electronic device, the conflict-free method may further comprise communicating with a second electronic device of the set of electronic devices to receive a third linear sequence and merging, at the first electronic device, the second linear sequence and the third linear sequence to generate a fourth linear sequence having characteristics of both the second linear sequence and the third linear sequence.

According to some embodiments, a conflict-free method may further comprise identifying a conflict between the second linear sequence and the third linear sequence. In accordance with identifying the conflict, the conflict-free method may comprise using the policy to determine which of the second linear sequence or the third linear sequence is a controlling linear sequence and which of the second linear sequence or the third linear sequence is a deferential linear sequence. In accordance with the conflict, the conflict-free method may further comprise using the controlling linear sequence to modify the deferential linear sequence to eliminate the conflict.

In some cases, a conflict may correspond to the unique user ID being at least partially stripped of at least one of the role or the authority associated with the role while the first electronic device was not in communication with other electronic devices. A conflict-free method may further comprise identifying a conflict between the second linear sequence and the third linear sequence and, in accordance with identifying the conflict, rolling back all operations of the second linear sequence that differ from the first linear sequence.

A conflict-free method may further comprise identifying a conflict between the second linear sequence and the third linear sequence, identifying a checkpoint node, and, in accordance with identifying the conflict and the checkpoint node, preventing any modification to the second linear sequence with respect to operations performed before the checkpoint node. The first linear sequence, the second linear sequence, and the third linear sequence may comprise one or more conflict-free replicated data types. The first electronic device may be a satellite or an electronic device on the satellite, the other electronic devices of the set of electronic devices may be terrestrial electronic devices, and the satellite or the electronic device on the satellite may perform operations in accordance with the role, the authority associated with the role, and the associated unique user ID, even when not in communication with the terrestrial electronic devices from which at least one of the role and the authority associated with the role were obtained.

According to some implementations, a computer-implemented method may be provided. The computer-implemented method may comprise obtaining, at an electronic device and while the electronic device is in communication with a network, a token granting access to a blockchain. The token may comprise a key identifier identifying a secret root key, a permission to access and/or add additional blocks to the blockchain, and a cryptographic hash of the secret root key and the permission. The computer-implemented method may further comprise receiving, at the electronic device and while the electronic device is not in communication with the network, a request to add a new block to a local version of the blockchain as stored within the electronic device, and, in accordance with the request satisfying the permission, at the electronic device, allowing an addition of the new block to the local version of the blockchain.

In some cases, the addition of the new block to the local version of the blockchain may be performed while the electronic device is not in communication with the network. Further, the blockchain may comprise a plurality of blocks. A block in the blockchain may define an authority of a cryptographic user ID, the authority defining at least an operation associated with the cryptographic user ID to perform on the blockchain, and using the token at the electronic device may comprise determining whether a user making the request has the authority to access the blockchain.

A computer-implemented method may further comprise, while the electronic device is not in communication with the network, revoking the authority associated with the cryptographic user ID. At a time after the authority associated with the cryptographic user ID is revoked, the computer-implemented method may comprise establishing a connection between the electronic device and the network, and, in accordance with establishing the connection, reverting any action performed by the cryptographic user ID after the authority was revoked. In some implementations, the network may contain a main blockchain different from the local version of the blockchain due to a fork. The local version of the blockchain may contain a checkpoint node that prevents reversion of any action made on the local version of the blockchain before the checkpoint node was established.

A computer-implemented method may further comprise, after the electronic device connects with the network, merging the local version of the blockchain with a main blockchain associated with the network. The merger between the local version of the blockchain and the main blockchain may occur without conflict between the local version of the blockchain and the main blockchain.

According to some implementations, a system may be provided. The system may comprise at least one processor and memory coupled to the at least one processor. The memory may comprise computer-executable instructions that, when executed by the at least one processor, operate to receive, at the at least one processor, a first linear sequence defining a set of blocks. The set of blocks may comprise a first block defining a policy specifying a role and an authority associated with the role, where the role is associated with at least one operation. The set of blocks may also comprise a second block comprising a unique user ID identifying a user and associating the unique user ID with the role and the authority associated with the role as specified in the policy. After receiving the first linear sequence, the computer-executable instructions may perform, using the at least one processor, the at least one operation in accordance with the role, the authority associated with the role, and the associated unique user ID. The computer-executable instructions may then create, at the at least one processor, a second linear sequence by appending a third block corresponding to performance of the at least one operation to the first linear sequence. After creating the second linear sequence and using the at least one processor, the computer-executable instructions may receive a third linear sequence from a network and merge, at the at least one processor, the second linear sequence and the third linear sequence to generate a fourth linear sequence having characteristics of both the second linear sequence and the third linear sequence.

In some embodiments, the fourth linear sequence may be generated in a conflict-free manner. The at least one processor may not be in communication with a network from which the third linear sequence is received when the second linear sequence is created. The at least one processor may be in orbit of the Earth when the second linear sequence is created. The second linear sequence may not be identical to the third linear sequence before the merger between the second linear sequence and the third linear sequence.

BRIEF DESCRIPTION OF THE DRAWINGS

Reference will now be made to representative embodiments illustrated in the accompanying figures. The following descriptions are not intended to limit the embodiments to one preferred embodiment. To the contrary, the disclosure is intended to cover alternatives, modifications, and equivalents as may be included within the spirit and scope of the described embodiments as defined by the appended claims. Identical reference numerals have been used, where possible, to designate features that are common to the figures.

The use of cross-hatching or shading in the accompanying figures is generally provided to clarify the boundaries between adjacent elements and to facilitate the legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, the proportions and dimensions (either relative or absolute) of the various features and elements (and collections and groupings thereof), and the boundaries, separations, and positional relationships presented therebetween, are provided in the accompanying figures to facilitate an understanding of the various embodiments described herein, may not necessarily be presented or illustrated to scale, and are not intended to indicate any preference or requirement for an illustrated embodiment to the exclusion of embodiments described with reference thereto.

DETAILED DESCRIPTION

The following disclosure relates to various techniques for managing access for one or more secured systems. The following disclosure also relates to conflict-free methods of governing user authority across one or more devices in a directed acyclic graph (DAG), such that partially non-identical linear sequences are merged in a conflict-free manner. The following disclosure may be applied to blockchain technologies, although it is not limited as such.

A user, during the course of daily life, may periodically access a number of secured systems, such as secured systems necessary for the user's work or that the user uses for personal services, such as for secured data storage or entertainment. However, control of resources directed to these secured systems is often contingent on the user's access to a central server and, when access to the central server is not available, the user may not be able to perform certain tasks. For example, a user may not be able to perform an action, such as editing a document, unless connected to a central server to avoid potential conflicts, such as when the document is being simultaneously edited by another user.

Methods and systems in accordance with the provided disclosures may eliminate the need for a central server and may allow users to independently access, or edit, a space. For example, methods and systems described here may utilize directed acyclic graphs (DAGs) and conflict-free replicated data types (CRDTs) to assist in providing proof of authority without communication with a central server. Any differences between linear sequences may be resolved at merge states in a conflict-free manner in accordance with applied policies. Further, unauthorized actions (e.g., actions performed after a user's authority was revoked) may be reverted during a merge state.

Figure 1:
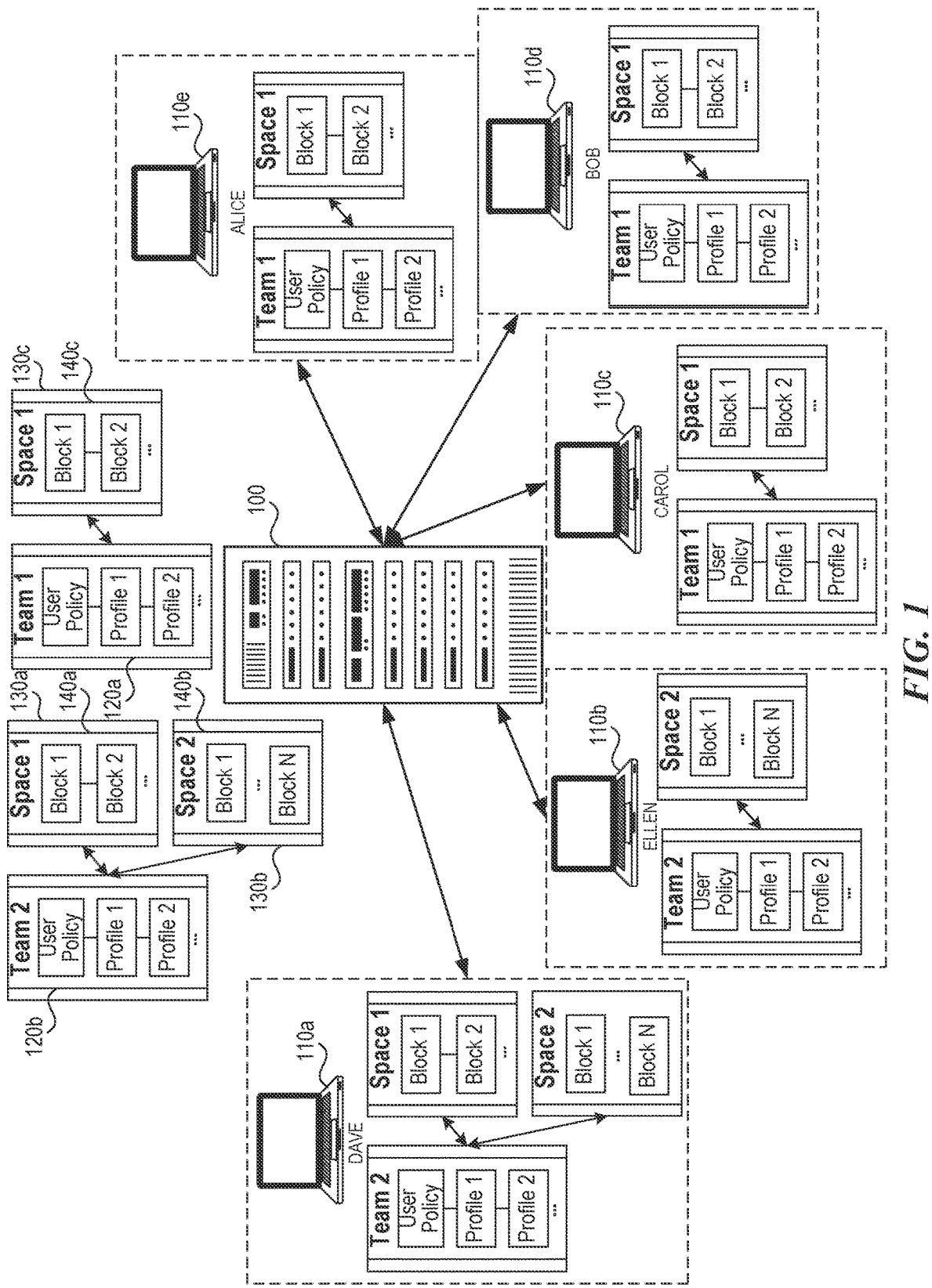
FIG. 1 depicts an example system for managing group authority and access to cryptographically secure data in a networked environment with a centralized server, as described herein.

FIG. 1 depicts a system to manage group authority and access to cryptographically secure data in a decentralized environment. The server 100 is in communication with multiple devices 110a, 110b, 110c, 110d, and 110e, also called endpoints or electronic devices. Each of these devices 110a-110e can be associated with an entity or user such as Dave, Ellen, Carol, Bob, and Alice. Each user may have a unique cryptographic user identification ("ID") and each device can have a unique cryptographic device ID. Each cryptographic user ID can have one or more cryptographic device IDs associated with it.

The unique cryptographic user IDs can be separated into teams, such as Team 1 and Team 2 as shown in FIG. 1. For example, Alice's, Bob's, and Carol's cryptographic user IDs can indicate membership in Team 1, while Dave's and Ellen's cryptographic user IDs can indicate membership in Team 2. Team 1 and Team 2 can have mutually exclusive membership, as shown in FIG. 1, or can have partially overlapping membership. The team membership can be recorded in a linear sequence, for example, a first team linear sequence 120a and a second team linear sequence 120b (only one instance of a team linear sequence labeled for brevity). The linear sequence, such as the team linear sequences 120a and 120b, may be a cryptographic data structure akin to a ledger. For example, because the linear sequence can be distributed across multiple devices, each of which independently verifies the linear sequence, the linear sequence can represent a distributed ledger.

Each Team 1 or 2 can have one or more associated spaces 130a, 130b, and/or 130c (only one instance of a space labeled for brevity). Each space 130a, 130b, and/or 130c can be a virtual compartment containing encrypted data for members having access to the encrypted data. A subset of team members can be included in one or more spaces 130a, 130b, and/or 130c and can be given authority to access encrypted data associated with the one or more spaces 130a, 130b, and/or 130c. In an example, Team 1 has space 130c, and team members Alice, Bob, and Carol are all invited to space 130c. In another example, Team 2 has spaces 130a and 130b. Space 130a only has Dave as a member, while space 130b has both Dave and Ellen as members. Each space 130a, 130b, and/or 130c can have encrypted data that can be made accessible only to the space members. Encrypted data can include content, data, or both. For example, encrypted data can include a file, a file system, a document, and/or messages such as instant messages, emails, chat messages, text messages, and so on.

In an example, only users Alice, Bob, and Carol have authority to the encrypted data associated with space 130c. In another example, only user Dave has the authority to the encrypted data associated with the space 130a, while both users Dave and Ellen have the authority to access encrypted data associated with space 130b. Authority to the encrypted data can include permission to read, write, and/or modify the encrypted data. Access to encrypted data can be granted upon verifying that the cryptographic user ID requesting the access has the authority encompassing the access.

For example, user Ellen's cryptographic user ID can have the authority to read the encrypted data in Space 2. However, if user Ellen's cryptographic user ID requests to write to the encrypted data, user Ellen's cryptographic user ID will be denied the access to write to the encrypted data if user Ellen's cryptographic user ID lacks the authority. In other words, in the system disclosed here, the access to the encrypted data cannot exceed the authority associated with the encrypted data.

In another embodiment, the teams 1 and 2 do not exist, and the users can be grouped into one or more spaces 130a, 130b, and/or 130c. To generate a space, a general pool of cryptographic user IDs that exist in the system can be searched to define the members of the space. The team linear sequences 120a and 120b can be integrated into the corresponding space linear sequence 140a, 140b, 140c. For example, the space linear sequence 140c can include the team linear sequence 120a, the space linear sequence 140a can include the team linear sequence 120b, and the space linear sequence 140b can include the team linear sequence 120b.

A record of the authority associated with the encrypted data can be computed by combining the team linear sequences 120a and/or 120b and a corresponding space linear sequence 140*a*, 140*b*, and/or 140*c*, as described further in this application. In addition to storing authority and membership, the space linear sequence 140*a*, 140*b*, and/or 140*c* can also store the encrypted data and/or references to the encrypted data.

A copy of the team linear sequences 120*a* and/or 120*b* and the space linear sequence 140*a*, 140*b*, and/or 140*c* can be distributed to all the devices 110*a*-110*e* whose cryptographic user IDs are members of the corresponding team and space as well as the server 100. For example, devices 110*c*-110*e* have a copy of the team linear sequence 120*a* and the space linear sequence 140*c* because the cryptographic user IDs associated with the devices 110*c*-110*e* are members of Team 1 and space 130*c*. In another example, device 110*a* has a copy of the team linear sequence 120*b* and space linear sequences 140*a* and 140*b* because user Dave's cryptographic user ID associated with the device 110*a* is a member of Team 2 and spaces 130*a* and 130*b*. In a third example, device 110*b* has a copy of the team linear sequence 120*b* and space linear sequence 140*b*, because user Ellen's cryptographic user ID associated with device 110*b* is a member of Team 2 and space 130*b*.

The metadata contained in the team linear sequences 120*a* and/or 120*b* and the space linear sequences 140*a*, 140*b*, and/or 140*c* can be stored in plain text, while the remainder of the data can be encrypted. The metadata can include authority information, policy information, roles, and so on, stored within the team linear sequences 120*a* and/or 120*b* and the space linear sequences 140*a*, 140*b*, and/or 140*c*. The remainder of the data can include confidential data such as files, filesystems, messages, and/or other confidential data. For example, filenames can be a part of the confidential data if the encrypted data includes files and/or filesystems. The filesystems, files, and/or messages can only be accessed by knowing the encryption key used in encrypting the data. Even if an attacker were to successfully gain control of the encryption key, a user's private key, and/or authorized endpoint device, the compromise of the system would be limited.

For example, if the attacker gains control of the encryption key associated with space 130*a*, the attacker would only be able to access confidential data within the space 130*a*, not the confidential data within spaces 130*b* and 130*c*. If an attacker obtains Ellen's private key, the attacker would only be able to access confidential data within the space 130*b*, and not spaces 130*a* and 130*c*. Thus, by compartmentalizing authority and access to spaces 130*a*, 130*b*, and 130*c*, the breach of the system can be confined.

Figure 2:
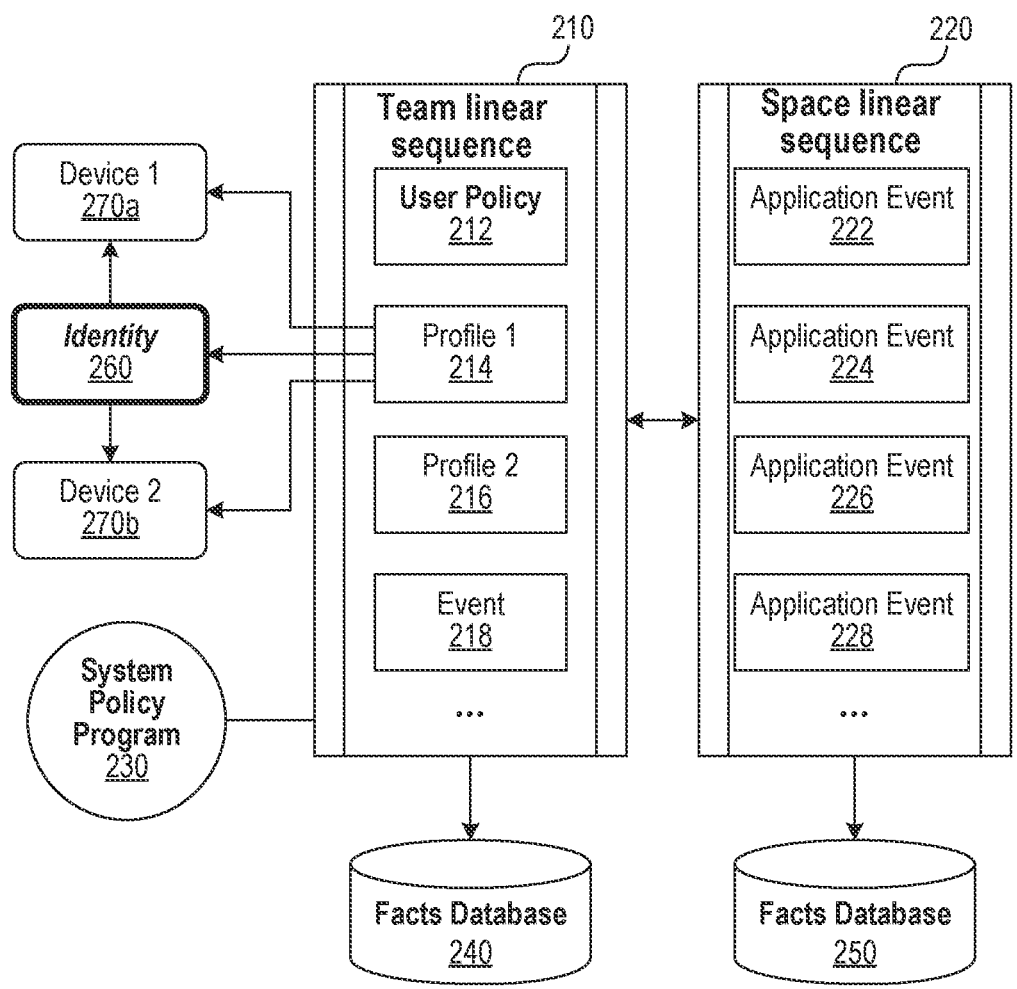
FIG. 2 depicts an example team linear sequence and a space linear sequence, as described herein.

FIG. 2 depicts a team linear sequence 210 and a space linear sequence 220. A team linear sequence 210 can be used to track identities of team members and their authority in a team. A space linear sequence 220 can be used to form a secure compartment which can admit a subset of the team members. The secure compartments are used to manage data and negotiate shared keys among the space members. The team linear sequence 210 can be connected to a system policy program 230 containing a system policy, as well as to a first database 240 containing facts. The space linear sequence 220 can rely on the team linear sequence 210 to determine policy within the space. The space linear sequence 220 can be connected to a second database 250 containing facts. In some embodiments, the first database 240 and the second database 250 are the same database.

The team linear sequence 210 and the space linear sequence 220 can each contain multiple blocks 212, 214, 216, 218, 222, 224, 226, and 228 (while eight blocks are depicted, more or fewer blocks may be provided in different embodiments). The initial block 212 ("user policy block") of the team linear sequence 210 can define a policy for the team. A policy can specify a role and an authority associated with the role. For example, a policy can specify "only administrators can create spaces within a team." A team policy can be obtained from the system policy program 230 or a policy template stored in a policy database and can be modified when instantiating the first block 212. Alternatively, the first block 212 can define the team policy without reference to the policy template. A system policy program 230 can be shared between different teams. The different teams, however, can have different fact databases (e.g., fact database 240). The team policy can also be modified by later blocks added to the team linear sequence 210, if the team policy defining block 212 permits modification.

The system policy program 230 can store policy templates that can be included and/or modified as policy in the initial block 212. The fact database 240 can contain unique key-value pairs that can define user and user authority within the system. For example, a key-value pair that can be added to the fact database 240 can be "Alice-administrator," after a block that specifies that Alice is an administrator has been verified.

Block 214 ("Profile 1") of the team linear sequence 210 can include a profile of the user that is a member of the team identified by the team linear sequence 210. The user profile can include the user's identity 260 which can be represented by a cryptographic user ID, such as a public key in an asymmetric cryptographic algorithm such as Rivest-Shamir-Adleman (RSA) or Diffie Hellman (DH). Only the user may be in possession of the private key. The user profile can also include a cryptographic device ID 270*a* and 270*b* associated with all the devices that the user has approved.

There are multiple ways that a device can be added to the system. For example, the user can approve the device by sending a request to add the device to the system, where the request is signed with a private key of the user. In another example, to approve a device, the user can perform a multi-step process. In the first step, the user can create a new set of device keys using the asymmetric cryptographic algorithm. In the second step, the user can sign the device keys with the user's private key and construct a device certificate containing the device public key and the user's private key signatures. In the third step, the device can send a request, which includes the certificate from the second step, to be added to the team, where the request is signed using the device private key. The system can authenticate that a team member has made the request by verifying the request using the public key of the user. The cryptographic device ID can be a cryptographic hash of the public key of the asymmetric cryptographic algorithm, while the private key can be known only to the device and can be used to authenticate actions performed by the device.

In some embodiments, a block 216 ("Profile 2") may be provided to the team linear sequence 210 and may identify a second user or a second profile of the user identified in block 214.

Block 218 ("Event") of the team linear sequence 210 can include an event such as addition of a new user, creation of the space linear sequence 220, a change to the system policy program 230, removal of an existing user, and/or a change of role of a user.

Blocks 222-228 ("Application Event") of the space linear sequence 220 can include respective events such as addition of a user to the space, addition of encrypted data to the space, removal of a user from the space, and so on. Each event 222-228 in the space linear sequence 220 complies with the policy defined in the team linear sequence 210. In some embodiments, a policy cannot be changed in the space linear sequence 220 and must be changed in the team linear sequence 210. A team can have multiple spaces with different policies by defining multiple space types having different policies, and establishing the spaces corresponding to the different space types. For example, a space type can include an "administrator space type" where all users have administrator roles and administrators add and remove other users and can have read and write access to the encrypted data. In another example, the space type can include "stratified space type" where some users have administrator roles, and some users have user roles, and the administrator roles have more authority than the user roles. Events in the team linear sequence 210 that change authority of a user can be stored in the first database 240.

The user policy 212 can be defined to enable users matching certain attributes to only have access to the space linear sequence 220 and space encrypted data for a limited amount of time. The passage of time can be measured by an always increasing clock that can provide a timestamp for each block 222-228 in the space linear sequence 220. A timestamp can, for example, state "11:46 AM Nov. 21, 2019 (PST)." In the space linear sequence 220, the timestamp is always increasing between subsequent blocks. To enable time-limited access to the space linear sequence 220 and associated encrypted data, the user policy 212 can state that "user associated with profile 1 can have access to the linear sequence until Dec. 2, 2019."

Figure 3:
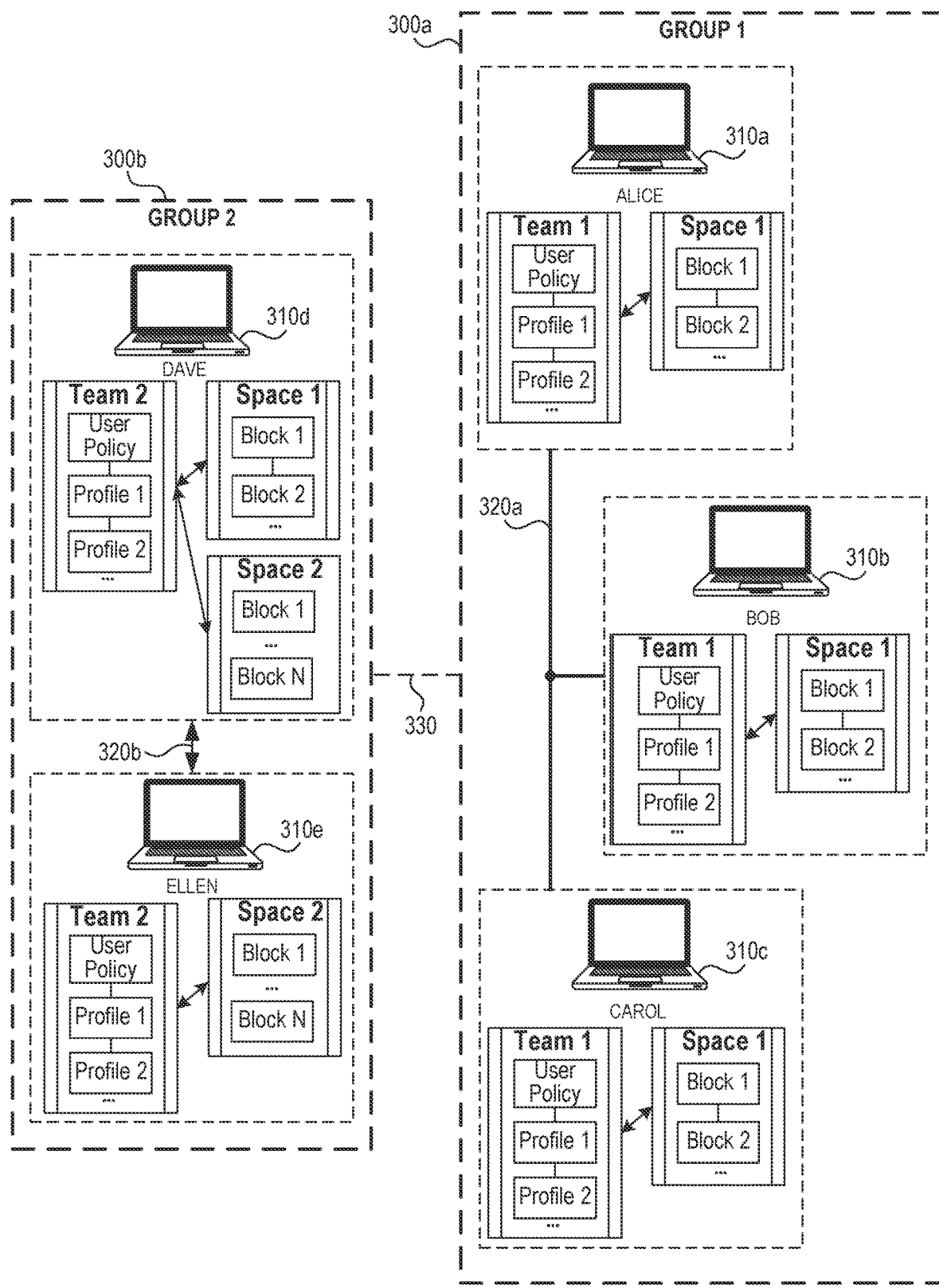
FIG. 3 depicts an example system for managing group authority and access to cryptographically secure data without a centralized server, as described herein.

FIG. 3 depicts an example system for managing group authority and access to cryptographically secure data without a centralized server, such as server 100 as depicted in FIG. 1.

In FIG. 3, a first group 300a, depicted as Group 1, may contain a first device 310a, a second device 310b, and a third device 310c. Each device 310a, 310b, and 310c may be associated with an entity or a user, such as Alice, Bob, and Carol, respectively, and may be assigned with one or more unique cryptographic user IDs and/or one or more cryptographic device IDs, as discussed with respect to FIGS. 1 and 2. The devices 310a, 310b, and 310c may be provided on the same network connection 320a, such as a local area network (LAN).

A second group 300b, depicted as Group 2, may contain a fourth device 310d and a fifth device 310e. Like the other devices discussed with respect to FIGS. 1 and 2, the devices 310d and 310e in Group 2 may be associated with one or more cryptographic user IDs and/or one or more cryptographic device IDs and may be provided on the same network connection 320b, such as a LAN.

As discussed with respect to FIGS. 1-2, each device 310a-310e may be associated with one or more teams, including a user policy and one or more profiles, and one or more spaces associated with the teams. These teams and/or spaces may comprise one or more blocks in the form of a linear sequence, as discussed with respect to FIGS. 1-2.

The first group 300a and the second group 300b may be separately provided on a first network (depicted as network 320a) and a second network (depicted as network 320b), respectively. The first network 320a may be independent from the second network 320b such that the first group 300a may not be in communication with the second group 300b during time periods where at least one of the first group 300a and the second group 300b are not connected to a connecting network 330 such as the Internet or an internal intranet network.

During periods when the first group 300a is not connected to the second group 300b, devices 310a-310c within the first group 300a may append blocks to a linear sequence associated with Team 1, as discussed with reference to FIG. 2, and devices 310d-310e within the second group 300b may append blocks to a linear sequence associated with Team 2. Since a central server (e.g., server 100 as depicted in FIG. 1) is not required in the embodiment depicted in FIG. 3, the linear sequences associated with the first group 300a and the second group 300b may be independently contained within the internal group networks 320a and 320b.

When the two independent networks 320a and 320b are connected by the connecting network 330, a merger between the linear sequences associated with Group 1 and Group 2 may occur to make the linear sequences consistent with each other. As discussed in further detail herein, the linear sequences may utilize conflict-free replicated data types (CRDTs), braided conflict resolution, and directed acyclic graphs (DAGs) to ensure convergence when groups converge in a merge state (e.g., when groups 300a and 300b are connected via connecting network 330).

Figure 4A:
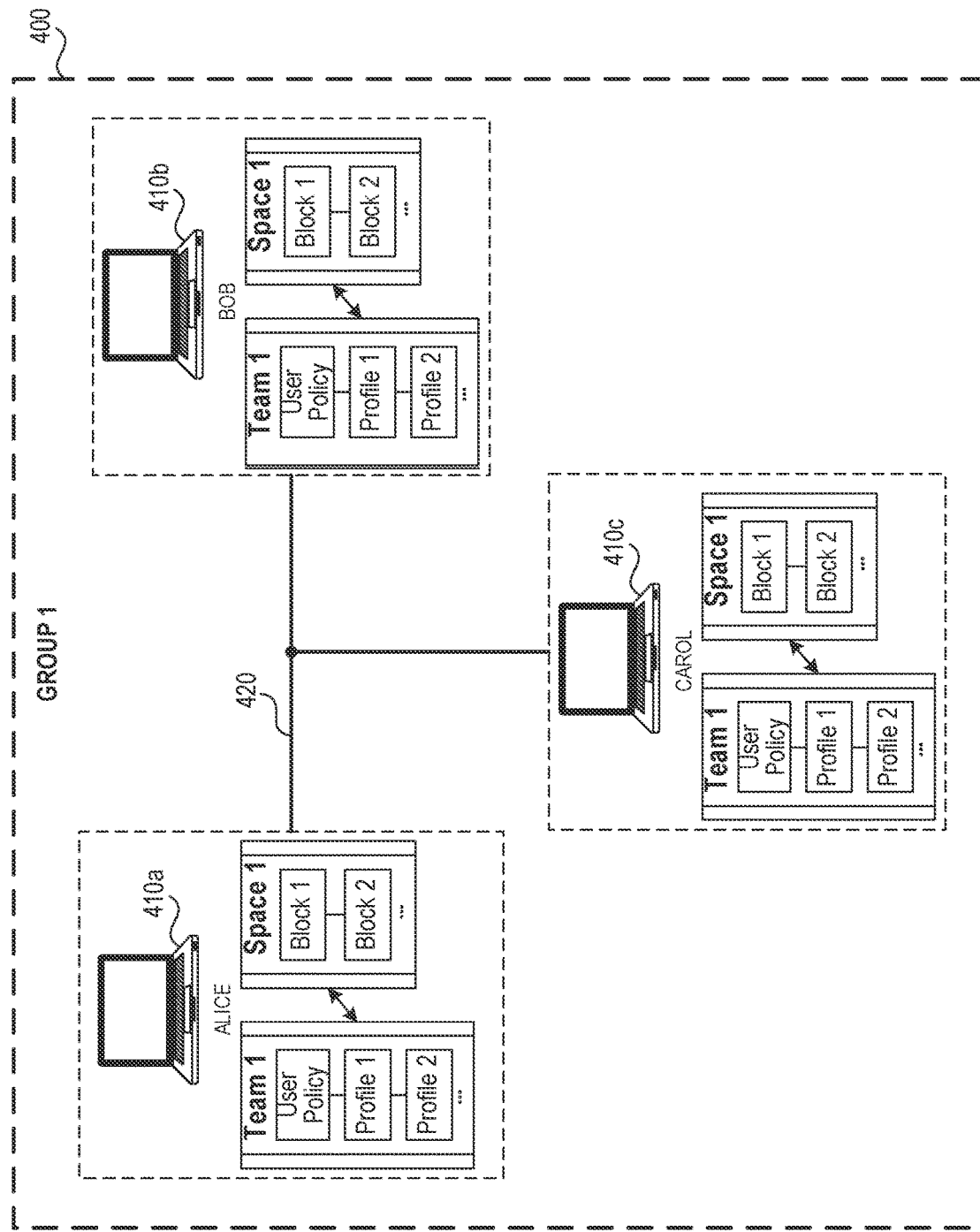
FIGS. 4A-4B depict an example system for managing group authority and access to cryptographically secure data in various states of network connectivity, as described herein.
Figure 4B:
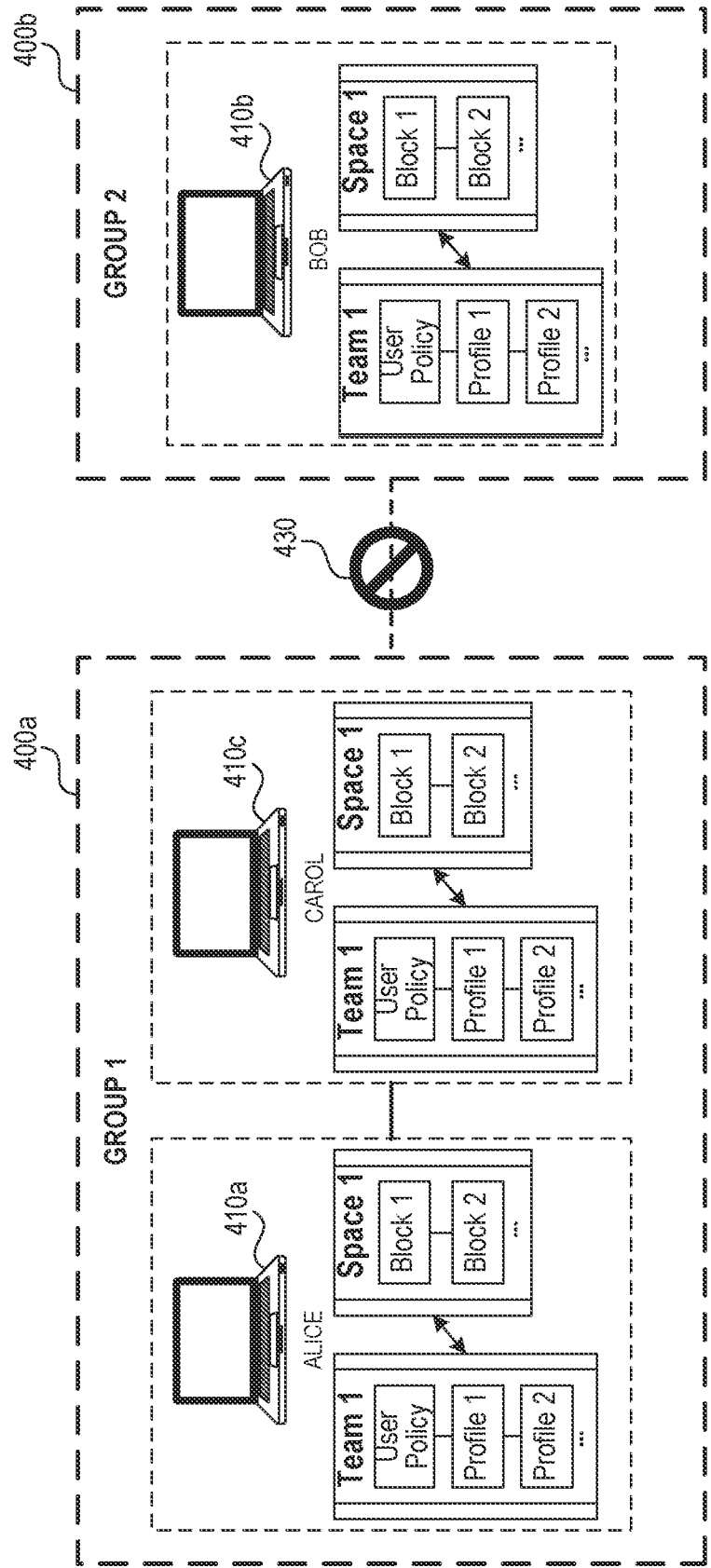

FIGS. 4A-4B depict an example system of a group 400, identified in FIGS. 4A-B as "Group 1." In FIG. 4A, a first device 410a, a second device 410b, and a third device 410c are provided. The devices 410a-410c may be associated with Alice, Bob, and Carol, respectively, and may be connected by an internal network 420 (e.g., a LAN). As discussed with reference to FIGS. 1-3, the devices 410a-410c may be assigned to certain teams (e.g., Team 1) and spaces (e.g., Space 1) and may append blocks to a team and/or space linear sequence to control access to cryptographically secure data without a centralized server.

For example, device 410a associated with Alice may be used to append a block to Space 1 and device 410b associated with Bob may be used to independently append a separate block to Space 1, as depicted in FIG. 4A. Devices 410a and 410b may communicate with each other via the network 420 into a merge state, where the linear sequence present on device 410a is merged with the linear sequence present on device 410b to produce a single, merged linear sequence. In situations where a CRDT is used, a merger between the linear sequences of devices 410a and 410b occurs in a conflict-free manner, as defined by a group policy, such that any potential differences between the linear sequences of devices 410a and 410b are resolved in a manner defined by the group policy. Since the merger is conflict-free, linear sequences can be merged without the intervention of an ordering server or administrator.

As depicted in FIG. 4A, all devices 410a-410c are connected via the network 420. As all devices 410a-410c are connected, merge states between any and/or all of devices 410a-410c may occur any time any one of devices 410a-410c append a block to a linear sequence associated with the linear device.

FIG. 4B depicts a scenario where one device, depicted as device 410b in FIG. 4B, is temporarily isolated, depicted as a no-network connection 430, from other devices, depicted as devices 410a and 410c in FIG. 4B. Devices 410a and 410c may be associated with a first group 400a and device 410b may be associated with a second group 400b. Though each of these devices 410a-410c are associated with the same team, such as Team 1, device 410b may append blocks to a local linear sequence (e.g., a linear sequence accessible only by device 410b) for a long period of time without merging with a linear chain associated with either of devices 410a or 410c. This may result in a linear sequence associated with the second group 400b being appreciably different from one or more linear sequences associated with the first group 400a.

However, even though device 410b may be associated with an appreciably different linear sequence, the use of CRDTs may ensure that when the first group 400a and the second group 400b merge, the merger occurs in a conflict-free manner regardless of the number of potentially conflicting actions that were taken in the respective linear sequences during the period of no-network connection 430.

Figure 5A:
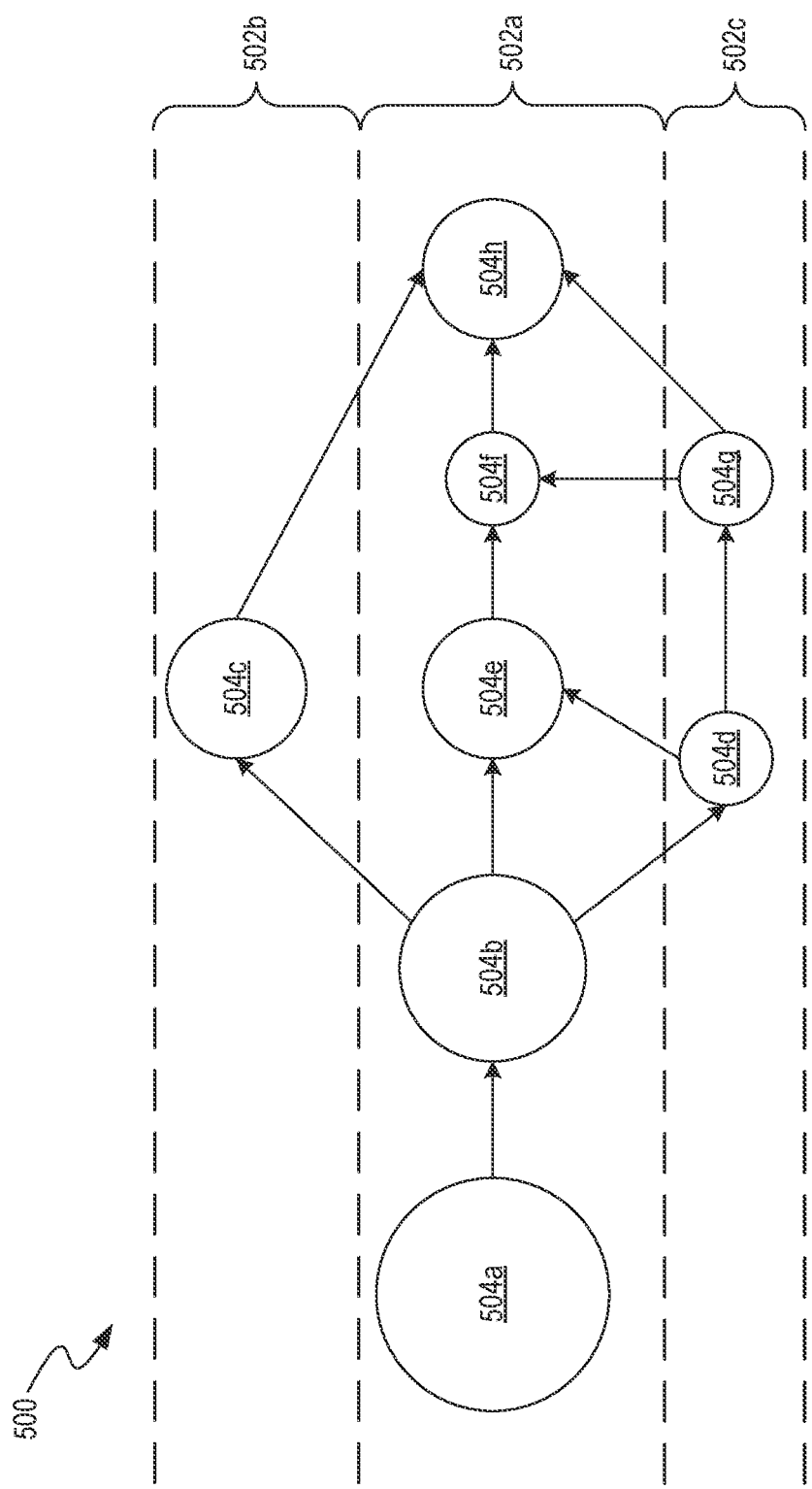
FIGS. 5A-5B depict example merging operations of electronic devices with respect to multiple branches of a blockchain, as described herein.
Figure 5B:
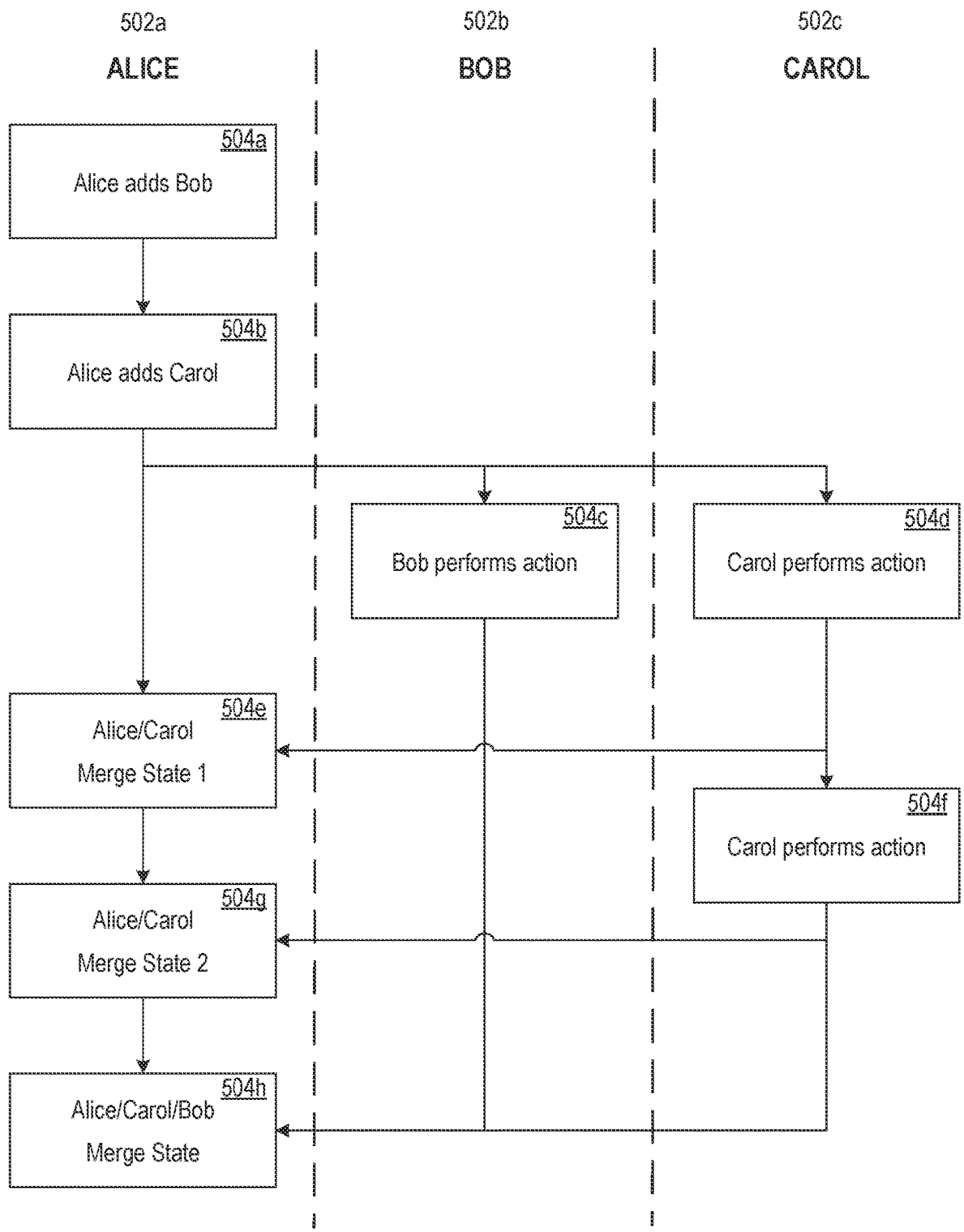

FIGS. 5A-5B depict example merging operations of devices with respect to multiple branches of a linear sequence, such as a blockchain. FIG. 5A depicts an example DAG 500 with a number of different nodes 504a-504h depicting actions or merge states.

The DAG 500 is a directed graph, with no directed cycles, that moves in a single direction (e.g., the DAG 500 does not move backwards). As the DAG 500 does not utilize a centralized, ordering server, the DAG 500 is serialized to support arbitrary branching and merging of a linear sequence, such as depicted in FIG. 5A. In the DAG 500, a vector clock associated with the CRDT protocol may implement the functionality of a memory barrier. The operation of the DAG 500 may be referenced as a "braided conflict resolution" as operations of the DAG 500 may be merged in a conflict-free manner even though multiple branches are periodically created.

FIG. 5B depicts a number of operations or merge states that can be undergone with respect to a team or space, such as described above, and will be described with reference to FIG. 5A. The operations in FIG. 5B are discussed with respect to an administrator who can add or remove people from a team or space. As discussed with respect to FIGS. 1-2, various cryptographic IDs for users and/or devices may be generated and/or assigned, though such description is omitted here for clarity.

At operation 504a, an administrator ("Alice") may add a user ("Bob") to a team or space. This operation 504a is depicted as a circle in FIG. 5A and may result in a block being appended to a linear sequence with respect to a device 502a operated by Alice.

At operation 504b, Alice may add a second user ("Carol") to the team or space. As with operation 504a, this operation 504b may also result in a block being appended to a linear sequence with respect to the device 502a. The linear sequence that results from operations 504a and 504b may be transmitted to devices 502b, associated with Bob, and 502c, associated with Carol, such that, as of the state indicated by operation 504b in FIG. 5A, all three devices 502a, 502b, and 502c share identical linear sequences.

However, once Bob and Carol begin performing actions, the linear sequences associated with the devices 502a-502c may begin to diverge, particularly if devices 502a-502c are not in constant communication. For example, Bob may perform an action, identified as operation 504c, when Bob's device 502b is not in communication with devices 502a or 502c. Operation 504c may be performed in accordance with permissions, roles, and/or authorities granted to Bob by an administrator, such as Alice. The operation 504c may be performed in accordance with permissions, roles, and/or authorities granted to Bob and these permissions, roles, and/or authorities may be accessible through Bob's device 502b without an active network connection to an administrator device (e.g., Alice's device 502a) or central authority. That is, as long as Bob's device 502b was in connection with an administrator device during a time when the permissions, roles, and/or authorities were granted, Bob's device 502b may operate in accordance with those permissions, roles, and/or authorities up until a time when those permissions, roles, and/or authorities are revoked.

The operation 504c, signifying an action performed on Bob's device 502b, such as accessing team or space resources, may result in a block being appended to a linear sequence associated only with Bob's device 502b. Likewise, Carol may perform an action, identified by operation 504d, while not being connected to either Bob's or Alice's device. Similarly, operation 504d may result in a block being appended to a linear sequence only associated with Carol's device 502c.

Operation 504e corresponds to a merge state between Alice's device 502a and Carol's device 502c. As depicted in FIGS. 5A-5B, Bob's device 502b is not included in the merge state 504e.

At operation 504e, the linear sequence associated with Alice's device 502a is merged with Carol's device 502c. For the process depicted in FIGS. 5A-5B, the result of this is that a block corresponding to the action performed by Carol in operation 504d is appended to the linear sequence associated with Alice's device 502a. In other embodiments, many operations may be performed on either Alice's device 502a or Carol's device 502c and all these operations would be merged into a linear sequence. That is, at operation 504e, the linear sequences associated with device 504a and device 504c are identical. Such a merger may occur in a conflict-free manner such that any potential inconsistencies between linear sequences between devices 502a and 502c are resolved according to a policy in accordance with a CRDT.

At operation 504f, Carol's device 502c may undergo another action after the merge state 504e. As with the action performed at operation 504d, this action 504f may cause a block to be appended to a linear sequence associated with Carol's device 502c. A second merge state 504e may occur when Carol's device 502c and Alice's device 502a are connected by a network allowing a communication between the two devices. As with the first merge state at 504e, the second merge state 504g is only between Alice's device 502a and Carol's device 502c, as Bob's device 502b has not yet been connected by a network to either Alice's or Carol's device 502a or 502c.

At the second merge state 504g, therefore, a linear sequence may include all events 504a, 504b, 504d, 504e, and 504f, but not 504c. This occurs even though operation 504c occurred at a time earlier than the operation at 504f. In accordance with the provided disclosure, the time at which an operation occurs on a linear sequence is measured with respect to the DAG 500 and not with respect to an absolute position in time.

The third merge state 504h signifies a merger between linear sequences between all devices 502a, 502b, and 502c. At the third merge state, all devices 502a, 502b, and 502c are connected by a common network allowing a communication between the three devices and all actions 504a-504h are merged into a single linear sequence. As discussed above, the actions 504a-504h may be merged in a conflict-free manner using CRDTs.

Figure 6A:
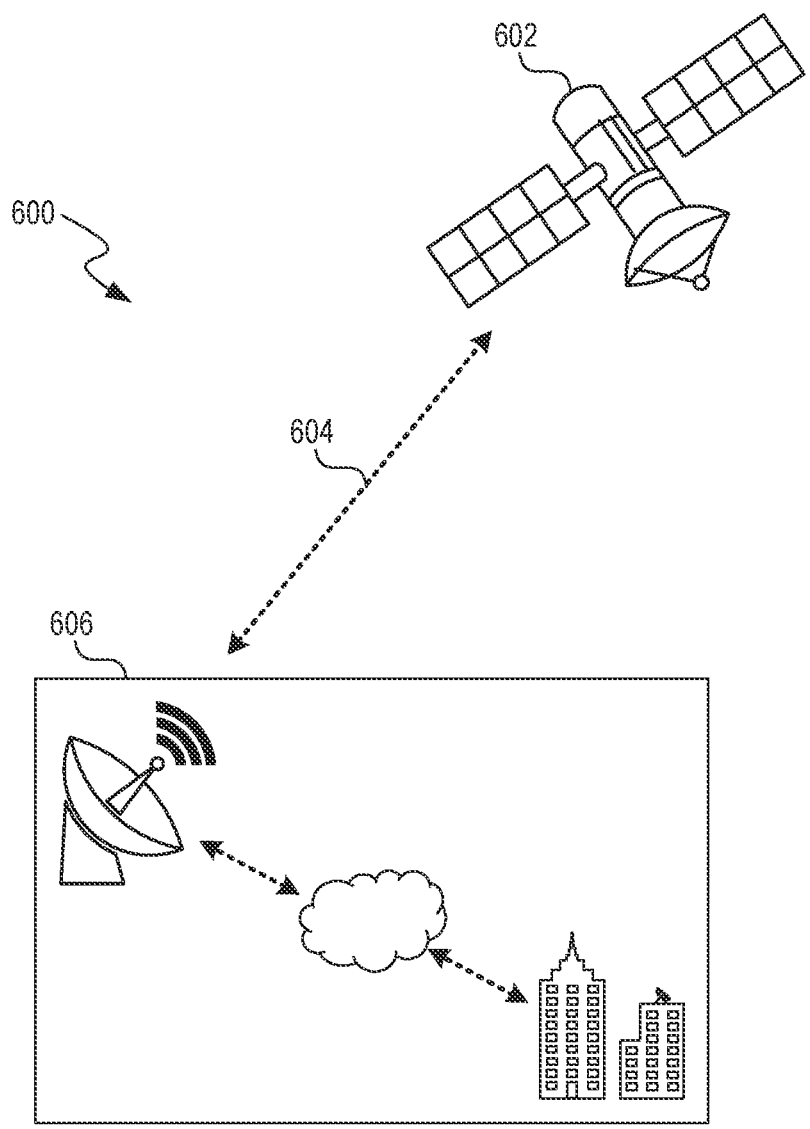
FIGS. 6A-6B depict an example satellite system in various states of network connectivity and operating in accordance with methods discussed herein.
Figure 6B:
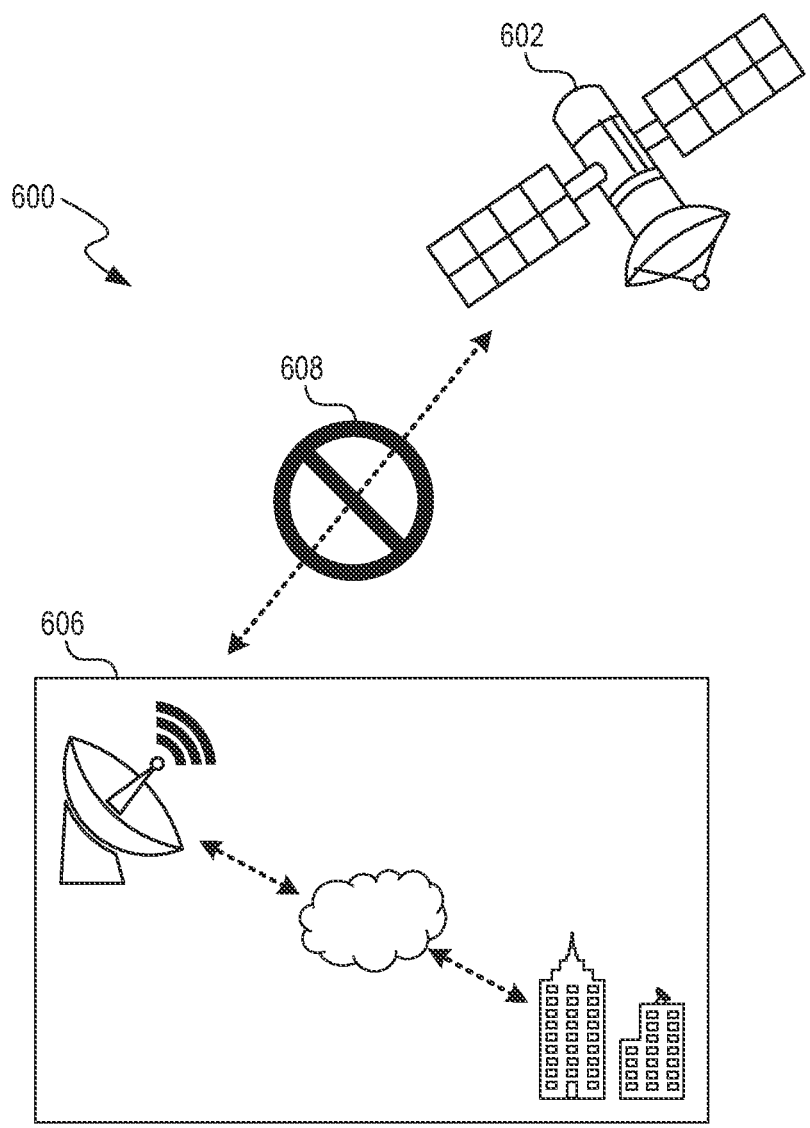

FIGS. 6A-6B depict an example implementation of a satellite system 600 operating in accordance with the embodiments discussed herein. In the embodiment illustrated in FIGS. 6A-6B, a satellite 602 may be granted one or more of a permission, a role, or an authority to perform certain operations, such as storing data within a database aboard the satellite or operating satellite sensors. From time to time, the satellite 602 may need to communicate with a ground system 606 via a communication link 604 in order to receive updated instructions or permissions. However, due to the satellite's presence in space, the satellite may occasionally move outside of a range of a ground system 606 and may be in a no-network state, such as identified by element 608 in FIG. 6B.

In conventional systems, the satellite would not be able to perform any operations that required a cryptographic key in accordance with a blockchain-based system having a centralized server, as any ordering operations would not be possible when the satellite is not in communication with the centralized server.

In embodiments of the present disclosure, the satellite 602 or systems aboard the satellite 602 may utilize CRDTs and/or DAGs to perform operations in accordance with granted authority even when the satellite is in a non-network state 608. Ultimately, a linear sequence associated with the satellite 602 may merge with a linear sequence associated with the ground system 606 when a communication link 604 is resumed.

Figure 7A:
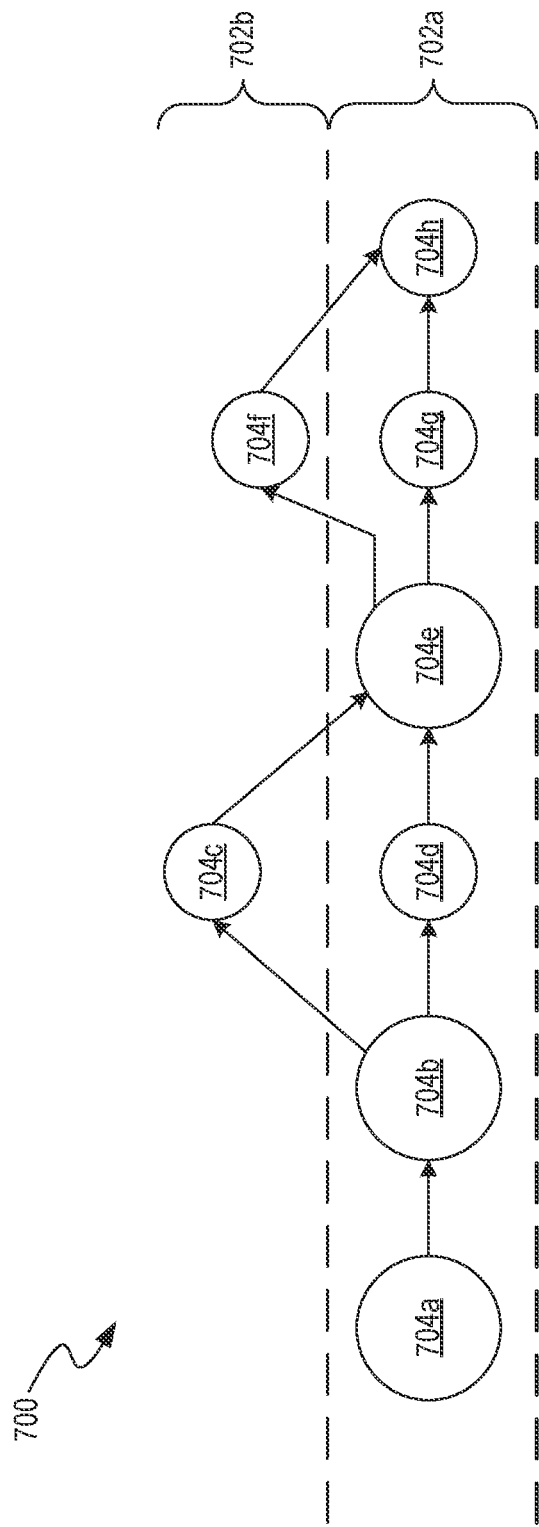
FIGS. 7A-7B depict an example operation where an action undertaken on a fork of a linear sequence is reverted, as described herein.
Figure 7B:
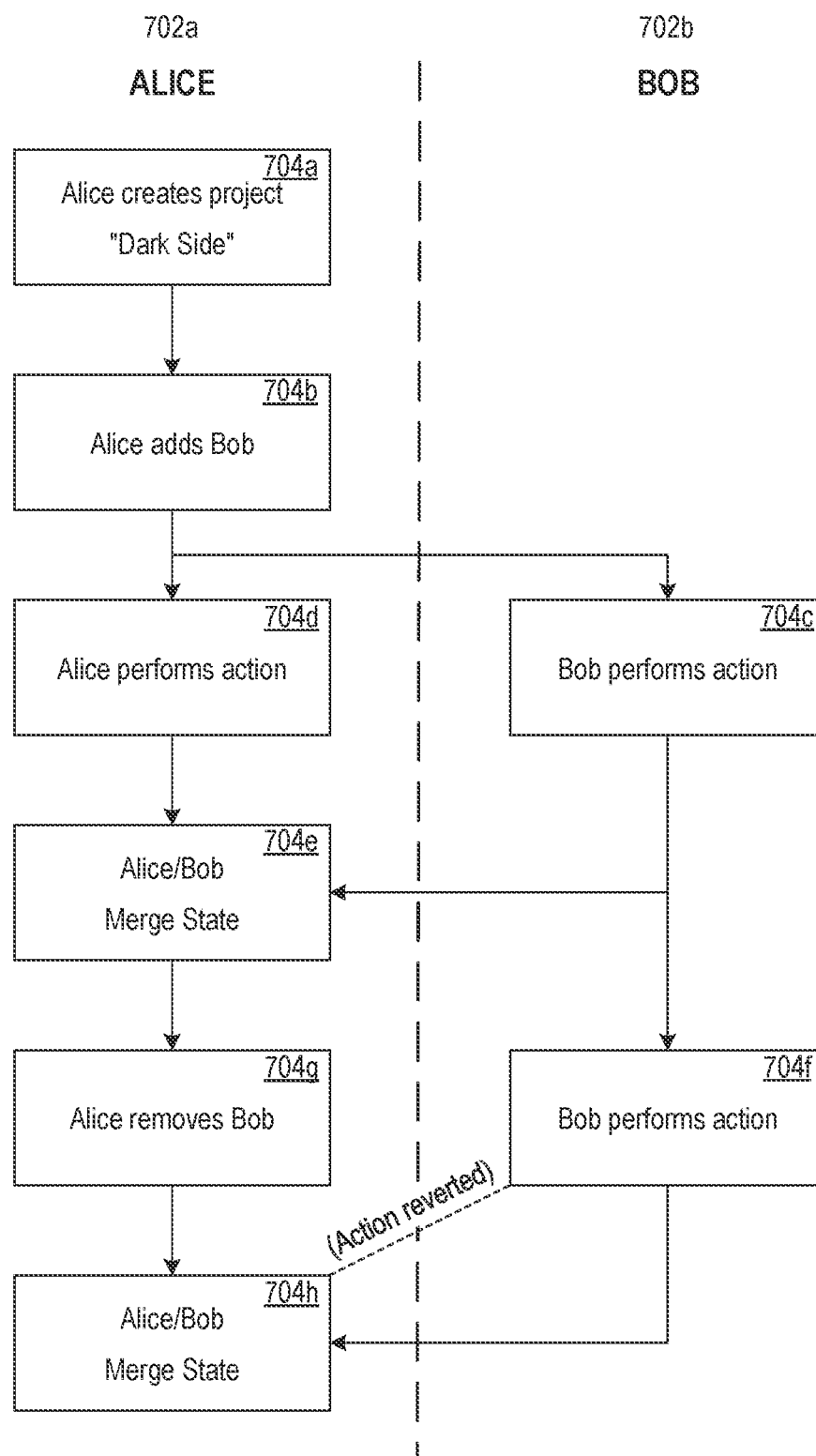

FIGS. 7A-7B depict example merging operations of devices with respect to multiple branches of a linear sequence, such as a blockchain. The embodiment depicted in FIGS. 7A-7B illustrates a scenario where a user's permissions, role, and/or authority is revoked during an instance where the revoked device is not connected by a network to the revoking device. FIG. 7A depicts an example DAG 700 with a number of different nodes 704a-704h depicting actions or merge states.

As discussed with respect to FIGS. 5A-5B, operations 704a-704e generally depict the creation of a project (e.g., at operation 704a), the addition of a user to the project (e.g., at operation 704b), actions performed while the devices 702a and 702b are not in communication with one another (e.g., at operations 704c and 704d), and a merge state 704e where the actions independently performed at operations 704c and 704d are combined into a common linear sequence.

However, FIGS. 7A-7B additionally depict a scenario where, when the devices 702a and 702b are not in a networked communication, an administrator (e.g., Alice) removes a user (e.g., Bob) from a project at operation 704g. Since the revoking device 702a is not in communication with the revoked device 702b, the revoked user (e.g., Bob) may continue performing actions, such as action 704f, since the revoked device 702b is not yet aware that its authority was revoked.

However, at operation 704h, the two devices 702a and 702b merge. At the merge state 704h, a conflict arises-specifically that the action 704f was performed after the authority for that action was revoked at operation 704g. Since the merge state 704h attempts to resolve all conflicts, in accordance with a team or space policy, any action that is performed in violation of such a policy may be reverted. As depicted in FIG. 7B, the merge 704h may resolve the conflict by reverting the action performed at operation 704f, which may result in the removal or cancellation of the block appended to a linear sequence with respect to device 702b. In embodiments that operate in accordance with FIGS. 7A-7B, therefore, unauthenticated actions may be reverted even if they are initially performed in accordance with perceived authority.

In some embodiments, however, the revocation of an action may result in a cascading effect which causes harm to a project, particularly when a device that acts as an administrator is isolated from a common network for extended periods.

Figure 8A:
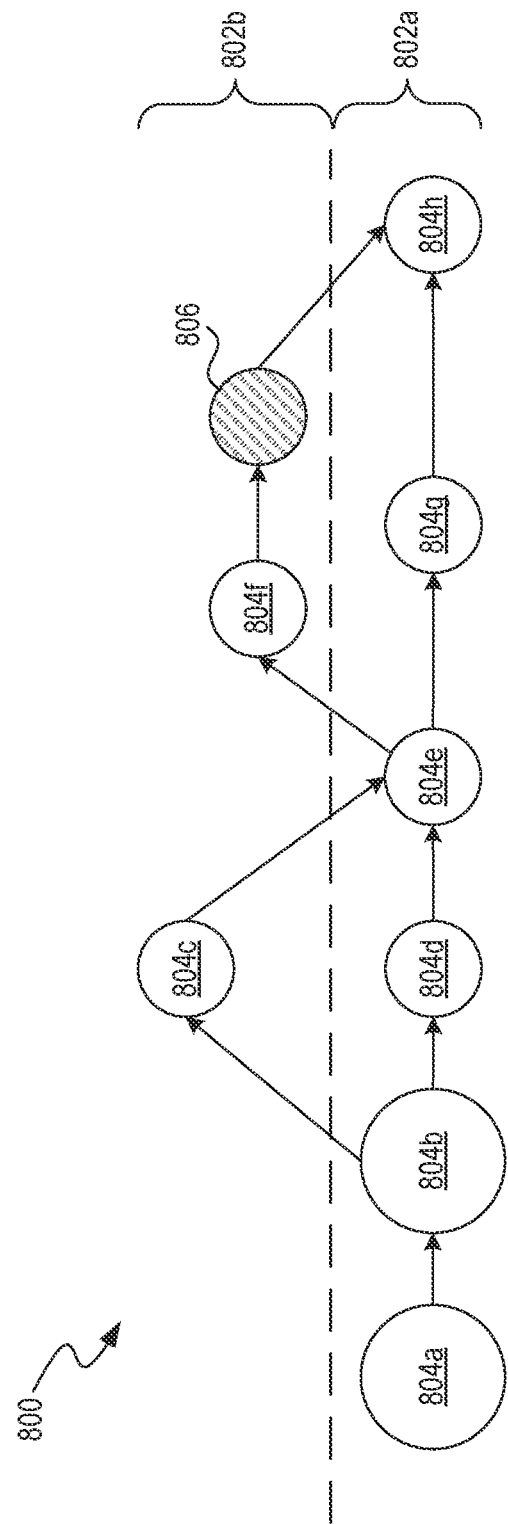
FIGS. 8A-8B depict an example operation including a checkpoint node, thereby preventing a reversion on a fork of a linear sequence, as described herein.
Figure 8B:
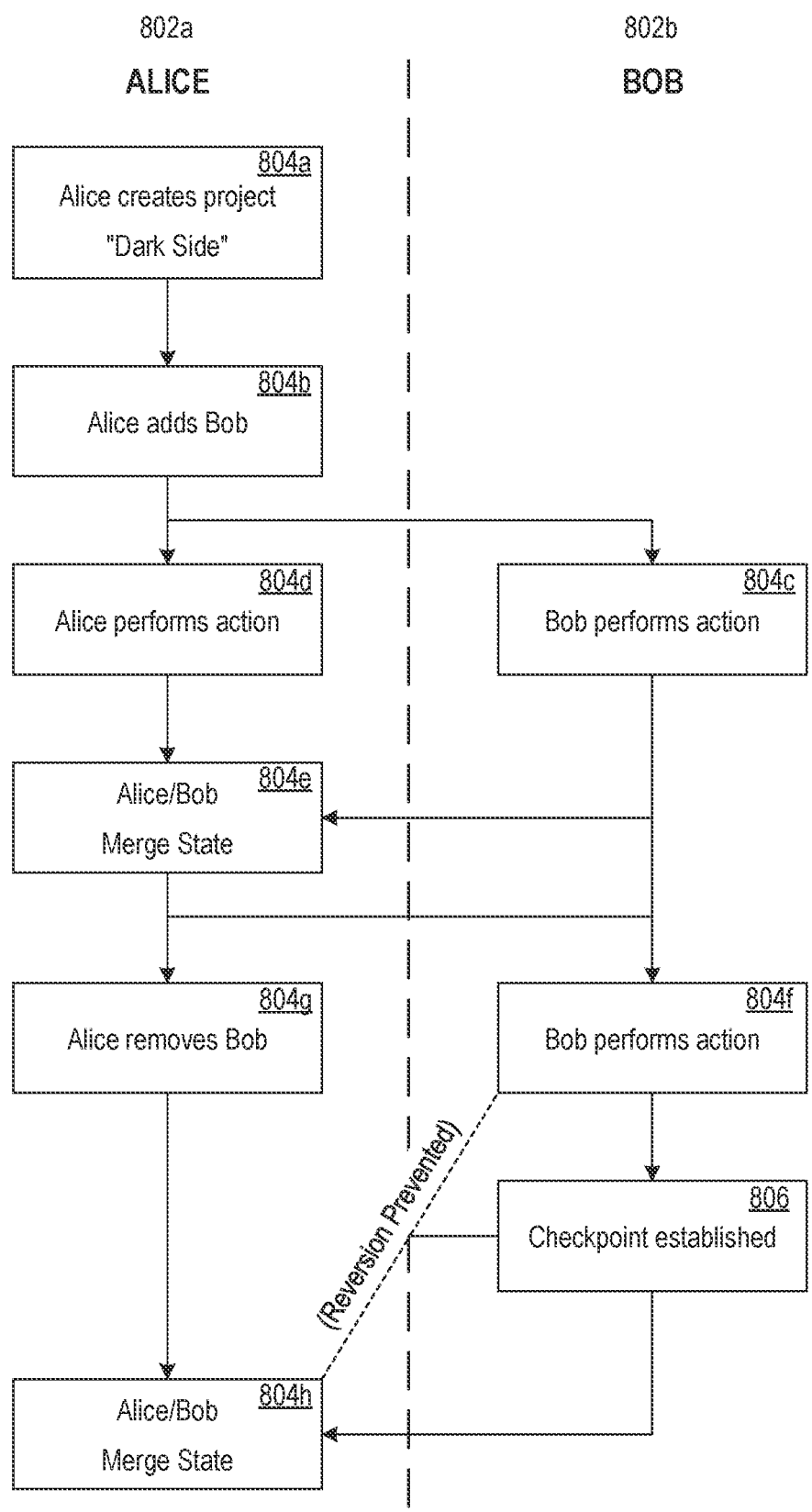

FIGS. 8A-8B depict example merging operations of devices with respect to multiple branches of a linear sequence, such as a blockchain. The embodiment depicted in FIGS. 8A-8B illustrates a scenario where a user's permissions, role, and/or authority is revoked during an instance where the revoked device is not connected by a network to the revoking device. However, unlike the embodiment described with respect to FIGS. 7A-7B, the embodiment depicted in FIGS. 8A-8B includes a checkpoint that is established to prevent a reversion. FIG. 8A depicts an example DAG 800 with a number of different nodes 804a-804h and 806 depicting actions, merge states, or checkpoints.

As discussed with respect to FIGS. 5A-5B and 7A-7B, operations 804a-804e generally depict the creation of a project (e.g., at operation 804a), the addition of a user to the project (e.g., at operation 804b), actions performed while the devices 802a and 802b are not in communication with one another (e.g., at operations 804c and 804d), and a merge state 804e where the actions independently performed at operations 804c and 804d are combined into a common linear sequence.

However, FIGS. 8A-8B additionally depict a scenario where, when the devices 802a and 802b are not in a networked communication, an administrator (e.g., Alice) removes a user (e.g., Bob) from a project at operation 704g. In addition, FIGS. 8A-8B depict the creation of a checkpoint 806 at device 802b after an action is performed at 804f.

At the second merge state 804g, an operation in accordance with a CRDT may attempt to revoke action 804f as it was performed after authority was revoked at operation 804g. However, the checkpoint 806 may prevent any changes to operations occurring before the checkpoint 806 was established. Therefore, the reversion may be prevented and the action 804f may be incorporated into the common linear sequence at the merge state 804h. In some embodiments, the presence of a checkpoint 806 may override a default policy of a CRDT and may act to trump established policies.

In some embodiments, a checkpoint 806 may only be established if a user has sufficient permissions, authority, and/or roles. For example, in some embodiments, only administrators are capable of establishing a checkpoint. In some embodiments, a checkpoint may be automatically established after a certain period of time has elapsed. For example, a checkpoint may be established every week, every day, every hour, and so on. In some embodiments, a checkpoint may be manually established by a user.

Figure 9:
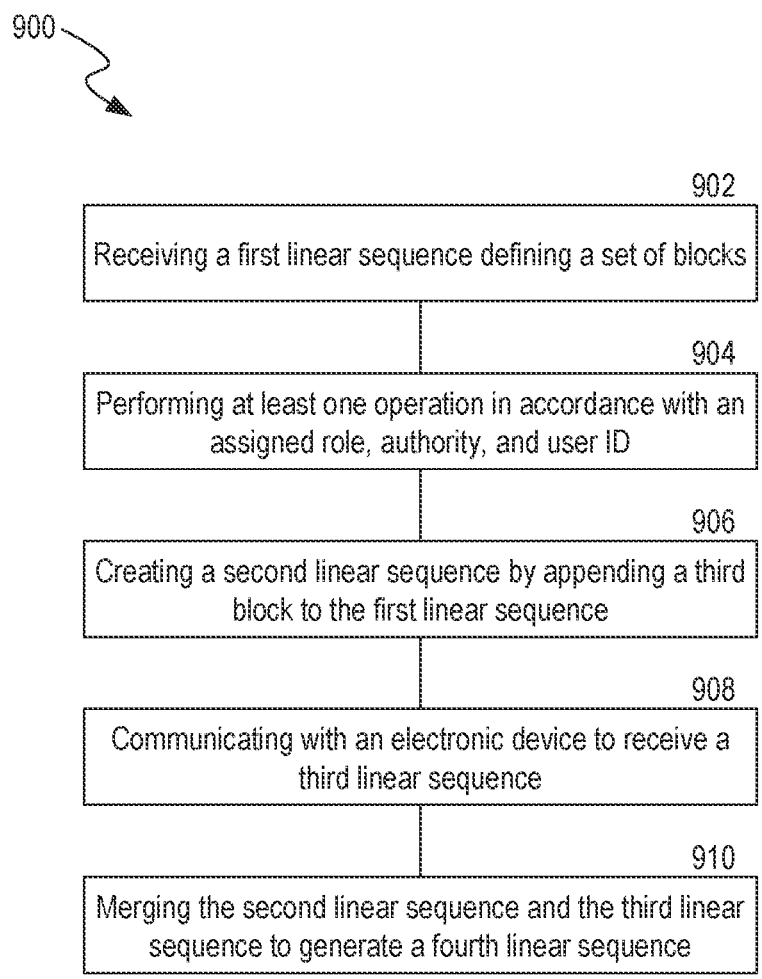
FIG. 9 is a flowchart of an example method of merging two or more linear sequences, as described herein.

FIG. 9 is a flowchart illustrating an example method 900 in accordance with at least some of the embodiments discussed herein. The method 900 may be a conflict-free method of independently governing user authority across one or more devices. The method 900 may be performed without a centralized server and/or authority.

At operation 902, a first electronic device may receive a first linear sequence defining a set of blocks. The first linear sequence may be part of a blockchain and may define one or more authorities, permissions, and/or roles associated with the first electronic device and/or a user of the first electronic device. The set of blocks may include a first block defining a policy specifying a role and an authority associated with the role, where the role is associated with at least one operation. The set of blocks may also include a second block comprising a unique user ID identifying a user and associating the unique user ID with the role and the authority associated with the role as specified in the policy. In some embodiments, more blocks may be appended to the first linear sequence, while in other embodiments, some blocks may be removed from the first linear sequence.

At operation 904, and after the first electronic device receives the first linear sequence, the first electronic device may perform at least one operation in accordance with the role, the authority associated with the role, and the associated unique user ID. The at least one operation may be performed when the first electronic device is not in communication with other electronic devices of the set of electronic devices and without the use of a centralized server and/or authority.

At operation 906, a second linear sequence may be created at the first electronic device. The second linear sequence may be created by appending a third block corresponding to performance of the at least one operation to the first linear sequence.

At operation 908, the first electronic device may communicate with a second electronic device. This may be referenced as a merge state and may result in the first electronic device receiving a third linear sequence from the second electronic device, where the third linear sequence is different from the second linear sequence.

At operation 910, the second linear sequence and the third linear sequence may merge at the first electronic device and/or the second electronic device to generate a fourth linear sequence having characteristics of both the second linear sequence and the third linear sequence.

Method 900 is an example method and other methods may be performed in accordance with the provided disclosure.

Figure 10:
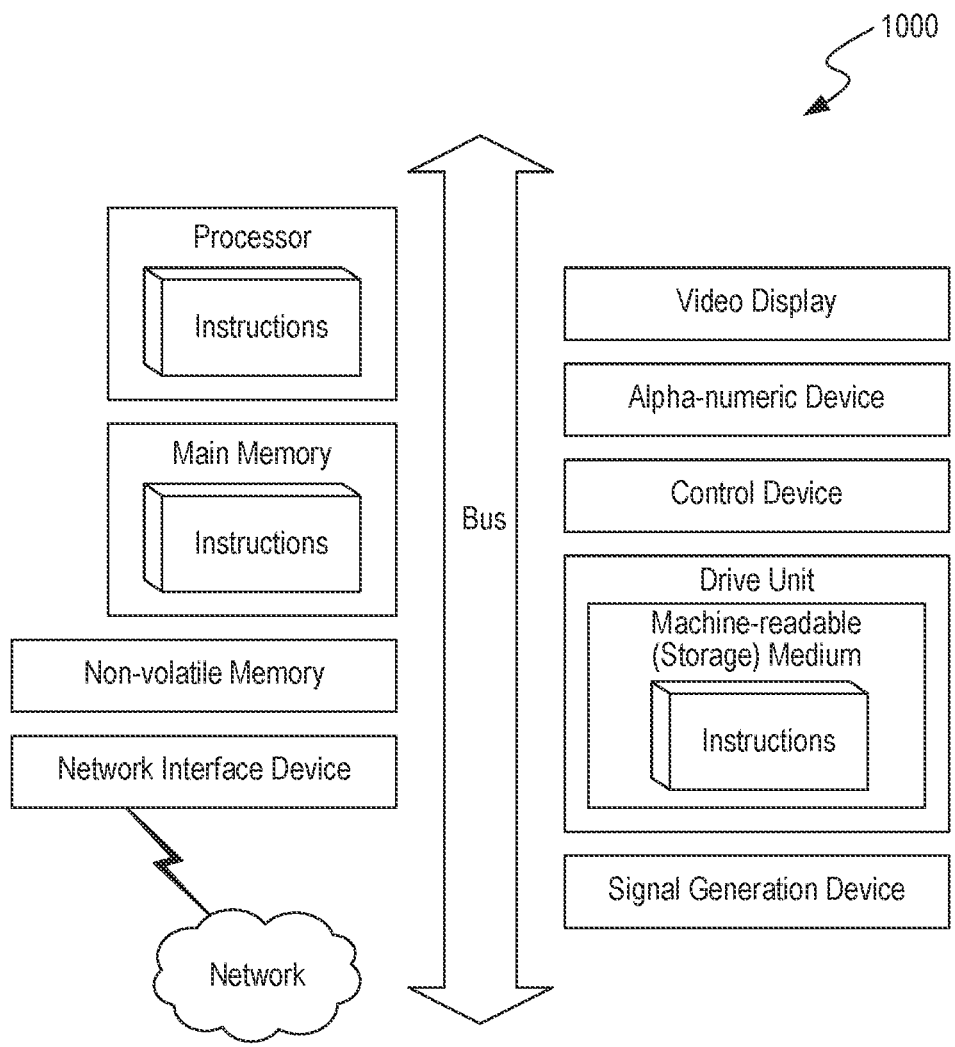
FIG. 10 is a diagrammatic representation of a machine in the example form of a computer system within which a set of instructions, for causing the machine to perform any one or more of the methodologies or modules discussed herein, may be executed, as described herein.

FIG. 10 is a diagrammatic representation of a machine in the example form of a computer system 1000 within which a set of instructions, for causing the machine to perform any one or more of the methodologies or modules discussed herein, may be executed.

In the example of FIG. 10, the computer system 1000 includes a processor, memory, non-volatile memory, and an interface device. Various common components (e.g., cache memory) are omitted for illustrative simplicity. The computer system 1000 is intended to illustrate a hardware device on which any of the components described in the example of FIGS. 1-9 (and any other components described in this specification) can be implemented. The computer system 1000 can be of any applicable known or convenient type. The components of the computer system 1000 can be coupled together via a bus or through some other known or convenient device.

A processor of the computer system 1000 can perform the various methods and instructions described in this application. The main memory, nonvolatile memory, and/or the drive unit of the computer system 1000 can store the instructions to be performed by the processor.

This disclosure contemplates the computer system 1000 taking any suitable physical form. As an example and not by way of limitation, the computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computer system 1000 may include one or more computer systems 1000; be unitary or distributed; span multiple locations; span multiple machines; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

The processor may be, for example, a conventional microprocessor as is commonly available. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer system 1000. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing an entire large program in memory may not even be possible. Nevertheless, it should be understood that for software to run, if necessary, it is moved to a computer-readable location appropriate for processing, and for illustrative purposes, that location is referred to in this paper as the memory. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 1000. The interface can include an analog modem, isdn modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 10 reside in the interface.

In operation, the computer system 1000 can be controlled by operating system software that includes a file management system, such as a disk operating system. One example of operating system software with associated file management system software is the family of operating systems known as Windows®. Another example of operating system software with its associated file management system software is the Linux™ operating system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the terms "machine-readable medium" and "machine-readable storage medium" should be taken to include a single medium or multiple media (e.g., a centralized or distributed database, and/or associated caches and servers) that store the one or more sets of instructions. The terms "machine-readable medium" and "machine-readable storage medium" shall also be taken to include any medium that is capable of storing, encoding, or carrying a set of instructions for execution by the machine and that cause the machine to perform any one or more of the methodologies or modules of the presently disclosed technique and innovation.

In general, the routines executed to implement the embodiments of the disclosure may be implemented as part of an operating system or a specific application, component, program, object, module, or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine-readable or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., compact disk read-only memory (CD-ROMS), digital versatile disks (DVDs), etc.), among others, and transmission-type media such as digital and analog communication links.

In some circumstances, operation of a memory device, such as a change in state from a binary one to a binary zero or vice versa, for example, may comprise a transformation, such as a physical transformation. With particular types of memory devices, such a physical transformation may comprise a physical transformation of an article to a different state or thing. As an example, but not by way of limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing examples are not intended to be an exhaustive list of circumstances in which a change in state from a binary one to a binary zero or vice versa in a memory device may comprise a transformation, such as a physical transformation. Rather, the foregoing are intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

From the foregoing, it will be appreciated that specific embodiments of the invention have been described herein for purposes of illustration, but that various modifications may be made without deviating from the scope of the invention. Accordingly, the invention is not limited except as by the appended claims.

I claim:

1. A computer-implemented cryptographic method, the computer-implemented cryptographic method comprising:
obtaining, at an electronic device while the electronic device is in communication with a network, a token granting access to a blockchain,
wherein the blockchain specifies an authority of a user or device associated with a cryptographic user ID to perform at least one operation on the blockchain,
wherein performing the at least one operation comprises determining whether the user or device is authorized to access the blockchain, and
wherein the token comprises a key identifier identifying a secret root key, a permission to access or add additional blocks to the blockchain, and
a cryptographic hash of the secret root key and the permission;
while the electronic device is not in communication with the network:
receiving a request to add a new block to a local version of the blockchain, the local version stored within the electronic device; and
revoking the authority associated with the cryptographic user ID;
establishing a connection between the electronic device and the network;
reverting any action performed by the user or device after the authority was revoked;
responsive to the request satisfying the permission:
allowing, at the electronic device, an addition of the new block to the local version of the blockchain.

2. The computer-implemented cryptographic method of claim 1, wherein the addition of the new block to the local version of the blockchain is performed while the electronic device is not in communication with the network.

3. The computer-implemented cryptographic method of claim 1, wherein a difference between the blockchain stored by the network and the local version of the blockchain is caused by a fork.

4. The computer-implemented cryptographic method of claim 1, wherein the local version of the blockchain contains a checkpoint node that prevents reversion of any action performed on the local version of the blockchain before the checkpoint node was established.

5. The computer-implemented cryptographic method of claim 1, comprising:
after the electronic device connects to the network, merging the local version of the blockchain with the blockchain.

6. The computer-implemented cryptographic method of claim 1, wherein a merger between the local version of the blockchain and the blockchain is performed without conflict between the local version of the blockchain and the blockchain.

7. A computer system comprising:
at least one processor; and
a non-transitory memory coupled to the at least one processor, the non-transitory memory comprising computer-executable instructions that, when executed by the at least one processor, operate to:
obtain, while the computer system is in communication with a network, a token granting access to a blockchain,
wherein a block in the blockchain specifies an authority of a user or device associated with a cryptographic user ID to perform at least one operation on the blockchain, and
wherein performing the at least one operation comprises determining whether the user or device is authorized to access the blockchain;
while the computer system is not in communication with the network:
receive a request to add a new block to a local version of the blockchain, wherein the local version is stored within the computer system; and
revoke the authority associated with the cryptographic user ID;
establish a connection between the computer system and the network;
revert any action performed by the user or device after the authority was revoked; and
responsive to the request satisfying a permission:
allow an addition of the new block to the local version of the blockchain.

8. The computer system of claim 7, wherein the addition of the new block to the local version of the blockchain is performed while the computer system is not in communication with the network.

9. The computer system of claim 7, wherein the token comprises a key identifier identifying a secret root key, the permission to access or add additional blocks to the blockchain, and a cryptographic hash of the secret root key and the permission.

10. The computer system of claim 7, wherein a difference between the blockchain stored by the network and the local version of the blockchain is caused by a fork.

11. The computer system of claim 7, wherein the local version of the blockchain contains a checkpoint node that prevents reversion of any action performed on the local version of the blockchain before the checkpoint node was established.

12. The computer system of claim 7, wherein the instructions, when executed by the at least one processor, operate to:
after the computer system connects to the network, merge the local version of the blockchain with the blockchain.

13. The computer system of claim 7, wherein a merger between the local version of the blockchain and the blockchain is performed without conflict between the local version of the blockchain and the blockchain.

14. A non-transitory memory coupled to at least one processor, the non-transitory memory comprising computer-executable instructions that, when executed by the at least one processor, operate to:
obtain, while the at least one processor is in communication with a network, a token granting access to a blockchain,
wherein the blockchain specifies an authority of a user or device associated with a cryptographic user ID to perform at least one operation on the blockchain, and
wherein performing the at least one operation comprises determining whether the user or device is authorized to access the blockchain;

while the at least one processor is not in communication with the network:
  receive a request to add a new block to a local version of the blockchain, wherein the local version stored by the at least one processor; and
  revoke the authority associated with the cryptographic user ID;
establish a connection between the at least one processor and the network;
revert any action performed by the user or device after the authority was revoked; and
responsive to the request satisfying a permission:
  allow an addition of the new block to the local version of the blockchain,
    wherein the local version of the blockchain contains a checkpoint node that prevents reversion of any action performed on the local version of the blockchain before the checkpoint node was established.

15. The non-transitory memory of claim 14, wherein the addition of the new block to the local version of the blockchain is performed while the at least one processor is not in communication with the network.

* * * * *